(12) United States Patent
Hughes et al.

(10) Patent No.: US 11,008,884 B2
(45) Date of Patent: May 18, 2021

(54) GENSETS AND METHODS OF PRODUCING GENSETS FROM AN ENGINE AND GENERATOR FOR HYBRID ELECTRIC PROPULSION

(71) Applicants: Rolls-Royce North American Technologies Inc., Indianapolis, IN (US); Rolls-Royce Corporation, Indianapolis, IN (US)

(72) Inventors: Melissa Hughes, Indianapolis, IN (US); Christopher Banham, Indianapolis, IN (US); Brian R Bennett, Avon, IN (US); Jason L Swindle, Mooresville, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 207 days.

(21) Appl. No.: 16/101,194

(22) Filed: Aug. 10, 2018

(65) Prior Publication Data
US 2020/0049026 A1    Feb. 13, 2020

(51) Int. Cl.
*F01D 15/10* (2006.01)
*B64D 27/26* (2006.01)
(Continued)

(52) U.S. Cl.
CPC ............. *F01D 15/10* (2013.01); *B64D 27/10* (2013.01); *B64D 27/12* (2013.01); *B64D 27/24* (2013.01);
(Continued)

(58) Field of Classification Search
CPC ........ B64D 27/00; B64D 27/10; B64D 27/12; B64D 27/26; B64D 2027/262;
(Continued)

(56) References Cited

U.S. PATENT DOCUMENTS 3,028,124 A * 4/1962 Sammons ............. B64D 27/12
                                                       244/54
3,837,164 A * 9/1974 Carr ........................ F02C 7/20
                                                       60/791
(Continued)

FOREIGN PATENT DOCUMENTS

FR          3061239          6/2018
FR          3061239 A1 *     6/2018 ............. B64D 35/00
(Continued)

OTHER PUBLICATIONS

Extended European Search Report dated Dec. 12, 2019, for European Application No. 19185563.4, Applicant, Rolls-Royce Corporation, et al., (6 pages).
(Continued)

*Primary Examiner* — Alain Chau
(74) *Attorney, Agent, or Firm* — Shumaker & Sieffert, P.A.

(57) ABSTRACT

According to one aspect, a genset includes a gas turbine engine having a low pressure shaft wherein the gas turbine engine is adapted to provide mechanical power to a propulsion type load. The genset further includes a generator having an input power shaft wherein the generator is adapted to receive mechanical power to develop electric power. The genset further includes an output power shaft having a first end coupled to the low pressure shaft of the gas turbine and a second end coupled to the input power shaft of the generator and a plurality of struts wherein the first ends of the plurality of struts are coupled to the gas turbine engine and second ends of the plurality of struts are coupled to the generator at locations substantially aligned with a center of gravity of the generator. A suspension apparatus attaches the gas turbine engine and the generator at mounting locations substantially aligned with a gas turbine engine center of
(Continued)

gravity and at mounting locations substantially aligned with the generator center of gravity, respectively.

20 Claims, 7 Drawing Sheets (51) Int. Cl.
| | | |
|---|---|---|
| *F02C 7/20* | (2006.01) |
| *B64D 27/10* | (2006.01) |
| *B64D 27/02* | (2006.01) |
| *B64D 27/12* | (2006.01) |
| *B64D 27/24* | (2006.01) |

(52) U.S. Cl.
CPC ............... *B64D 27/26* (2013.01); *F02C 7/20* (2013.01); *B64D 2027/026* (2013.01); *B64D 2027/266* (2013.01); *F05D 2220/323* (2013.01); *F05D 2220/768* (2013.01)

(58) Field of Classification Search
CPC ........ B64D 2027/266; B64D 2027/268; B64D 2027/026; F02C 7/20; F01D 15/10; F05D 2220/323; F05D 2220/76; F05D 2220/768
See application file for complete search history.

(56) References Cited

U.S. PATENT DOCUMENTS

| | | | | |
|---|---|---|---|---|
| 4,706,901 A | * | 11/1987 | von Broock | B64D 27/00 244/54 |
| 6,264,138 B1 | | 7/2001 | Hawkins | |
| 8,240,641 B2 | * | 8/2012 | McGuire | B64D 27/26 267/33 |
| 8,517,304 B2 | * | 8/2013 | Journade | B64C 11/48 244/54 |
| 8,727,269 B2 | * | 5/2014 | Stuart | B64D 27/18 244/54 |
| 10,017,267 B2 | * | 7/2018 | Pautis | F02C 7/20 |
| 2005/0178889 A1 | | 8/2005 | Machado et al. | |
| 2010/0116965 A1 | * | 5/2010 | McGuire | B64D 27/26 248/557 |
| 2016/0023773 A1 | | 1/2016 | Himmelmann et al. | |
| 2016/0178464 A1 | | 6/2016 | Burns et al. | |
| 2017/0313431 A1 | | 11/2017 | Florent et al. | |
| 2018/0281980 A1 | * | 10/2018 | Riviere | B64D 27/26 |

FOREIGN PATENT DOCUMENTS

| | | | | |
|---|---|---|---|---|
| GB | 864540 | | 4/1961 | |
| GB | 864540 A | * | 4/1961 | ............ B64D 27/12 |
| WO | WO 2005/044662 A1 | | 5/2005 | |

OTHER PUBLICATIONS

Communication under Rule 71(3) EPC from counterpart EP Application No. 19185563.4 dated Sep. 10, 2020, 53 pgs.

Response to Extended European Search Report from counterpart EP Application No. 19185563.4 dated Dec. 12, 2019, filed Jun. 24, 2020, 71 pgs.

* cited by examiner

GENSETS AND METHODS OF PRODUCING GENSETS FROM AN ENGINE AND GENERATOR FOR HYBRID ELECTRIC PROPULSION

FIELD OF DISCLOSURE

The present subject matter relates generally to power systems, and more particularly to a method of producing a genset, such as a turbogenerator for hybrid electric propulsion systems and or other electric loads.

BACKGROUND

In known aerospace power applications that develop mechanical power using a gas turbine engine, the engine low pressure (LP) shaft torque and engine weight must be reacted within the overall system for desired aircraft operation. For a traditional aerospace turboprop engine system, this load reaction is addressed in conjunction with the propeller gearbox (PGB) and by properly integrating the components with structural elements of the aircraft.

In some applications it may be desirable to use certain components of a turboprop engine system to produce a system that develops electric power. For example, one may wish to use a generator—that receives mechanical power from a gas turbine engine—to drive an electric motor that assists in aircraft propulsion or to power electric loads, such as in a hybrid power generation system (PGS). In such a case, if the PGB and associated hardware are removed and an electric generator is instead coupled to and driven by the LP shaft, the torque and weight of the generator must be properly reacted to facilitate the operation of the hybrid PGS for either ground or flight applications. In general, the combination of a gas turbine engine and a generator is referred to as a genset.

U.S. Published Patent Application No. 2005/0178889 discloses a structure for mounting a turboprop engine under an aircraft wing having a rigid structure. The rigid structure comprises a box and the mounting structure comprises at least two lateral connecting rods resisting the engine torque generated by the turboprop engine. The connecting rods are arranged on each side of the box and each includes a forward end connected to a gear box of the turboprop engine and an aft end connected to said box.

U.S. Pat. No. 6,264,138 discloses a turboprop propulsion aircraft having a plurality of gas turbine engines. Each gas turbine engine comprises a two-stage reduction gearbox with an engine output shaft disposed in line with a propeller drive output shaft to drive a propeller in front of the engine in a tractor mode of propulsion. An input gear reduction stage and an output gear reduction stage share a plurality layshafts mounted in fixed circularly-spaced relation to each other about the axis of the output shafts in the mechanical housing in the aircraft. Each layshaft has a layshaft first end toward the rear, input end of the gearbox, and a layshaft second end toward the output, front end of the gearbox. The layshaft gears are arranged to avoid any net thrust loading of the layshafts. Spur and double helical gears are used in FIG. 4, while spur gears are used in FIG. 6 with suitable helix settings to neutralize end thrust on the layshaft. Cantilever layshaft input gear mounting in rear bearings enables same to share some layshaft output gear load sharing with the front bearing. A torquemeter is situated at the gearbox input end. The engine output gear, gearbox output gear, and propeller all have collinear rotational axes.

U.S. Published Patent Application No. 2016/0178464 discloses a gas turbine engine torque monitoring system including a gas turbine engine and gas turbine engine electronics. The gas turbine engine includes a torque sensor coupled to a rotatable element of the gas turbine engine, such as a drive shaft. The torque monitoring system analyzes torque signals output by the torque sensor using a combination of frequency domain analysis and time domain analysis, and generates an interpretation of the torque sensor output signals. The gas turbine engine torque monitoring system can initiate a variety of different types of actions in relation to the gas turbine engine based on the interpretation of the torque sensor output signals.

WO 2005/044662 discloses an aircraft propulsion system comprising two uncoupled separately operable turboprop gas turbine engines. Rotary axes of the engines are inclined relative to one another in a horizontal and/or vertical plane and each of which is connected by a drive shaft to a compound gearbox that drives a pair of coaxial contra-rotating airscrew shafts.

U.S. Published Patent Application No. 2016/0023773A1 discloses mounting of an electric machine co-axially with or mechanically linked to a low-pressure turbine (LPT) shaft. The electric machine can function as a generator or as a motor in different operational phases. Additionally, the electric machine can be located downstream of the LPT or upstream of the low-pressure compressor.

U.S. Published Patent Application No. 2017/0313431A1 discloses a suspension for a propulsion assembly comprising a gas generator coupled by a coupling mechanism to a thrust generator having a structural torque transmission gearbox. A rigid cradle rigidly supports the thrust generator in a first suspension plane and the gas generator in distinct second and third suspension planes.

SUMMARY

According to one aspect, a genset includes a gas turbine engine having a low pressure shaft wherein the gas turbine engine is adapted to provide mechanical power to a propulsion type load. The genset further includes a generator having an input power shaft wherein the generator is adapted to receive mechanical power to develop electric power. The genset further includes an output power shaft having a first end coupled to the low pressure shaft of the gas turbine and a second end coupled to the input power shaft of the generator and a plurality of struts wherein the first ends of the plurality of struts are coupled to the gas turbine engine and second ends of the plurality of struts are coupled to the generator at locations substantially aligned with a center of gravity of the generator. A suspension apparatus attaches the gas turbine engine and the generator at mounting locations substantially aligned with a gas turbine engine center of gravity and at mounting locations substantially aligned with the generator center of gravity, respectively.

According to a further aspect, a method of producing a genset includes the steps of (a.) providing a gas turbine engine having a low pressure shaft wherein the gas turbine engine is adapted to provide mechanical power to a propulsion type load, and (b.) providing a generator having an input power shaft. The method further includes the steps of (c.) providing an output power shaft having a first end and a second end, (d.) providing a plurality of struts, (e.) securing first ends of the plurality of struts to the gas turbine engine, (f.) securing second ends of the plurality of struts to the generator at locations substantially aligned with a center of gravity of the generator, (g.) coupling the low pressure shaft of the gas turbine engine to the first end of the output power shaft, and coupling the input power shaft of the generator to the second end of the output power shaft, and (h.) suspending the gas turbine engine and the generator at an engine mounting location substantially aligned with a center of gravity of the gas turbine engine and at a generator mounting location substantially aligned with the generator center of gravity, respectively.

According to yet another aspect, a method of producing a genset comprises the steps of (a.) providing an engine having a low pressure shaft wherein the engine is adapted to be coupled to a gearbox, (b.) providing a generator having an input power shaft and a generator mounting pad, (c.) providing an output power shaft with a first end and a second end wherein the first end is adapted to be coupled to the low pressure shaft of the engine and the second end is adapted to be coupled to a gearbox, (d.) securing a first mounting fitting to the engine, and (e.) securing a second mounting fitting to the generator. The method further comprises the steps of (f.) providing at least one strut, (g.) securing a first end of the strut to the first mounting fitting, (h.) securing a second end of the strut to the second mounting fitting to support the generator at a location substantially aligned with a center of gravity of the generator, and (i.) coupling the output power shaft at the first end to the low pressure shaft of the engine and the second end to the input power shaft of the generator.

Other aspects and advantages will become apparent upon consideration of the following detailed description and the attached drawings wherein like numerals designate like structures throughout the specification.

DETAILED DESCRIPTION

Figure 1:
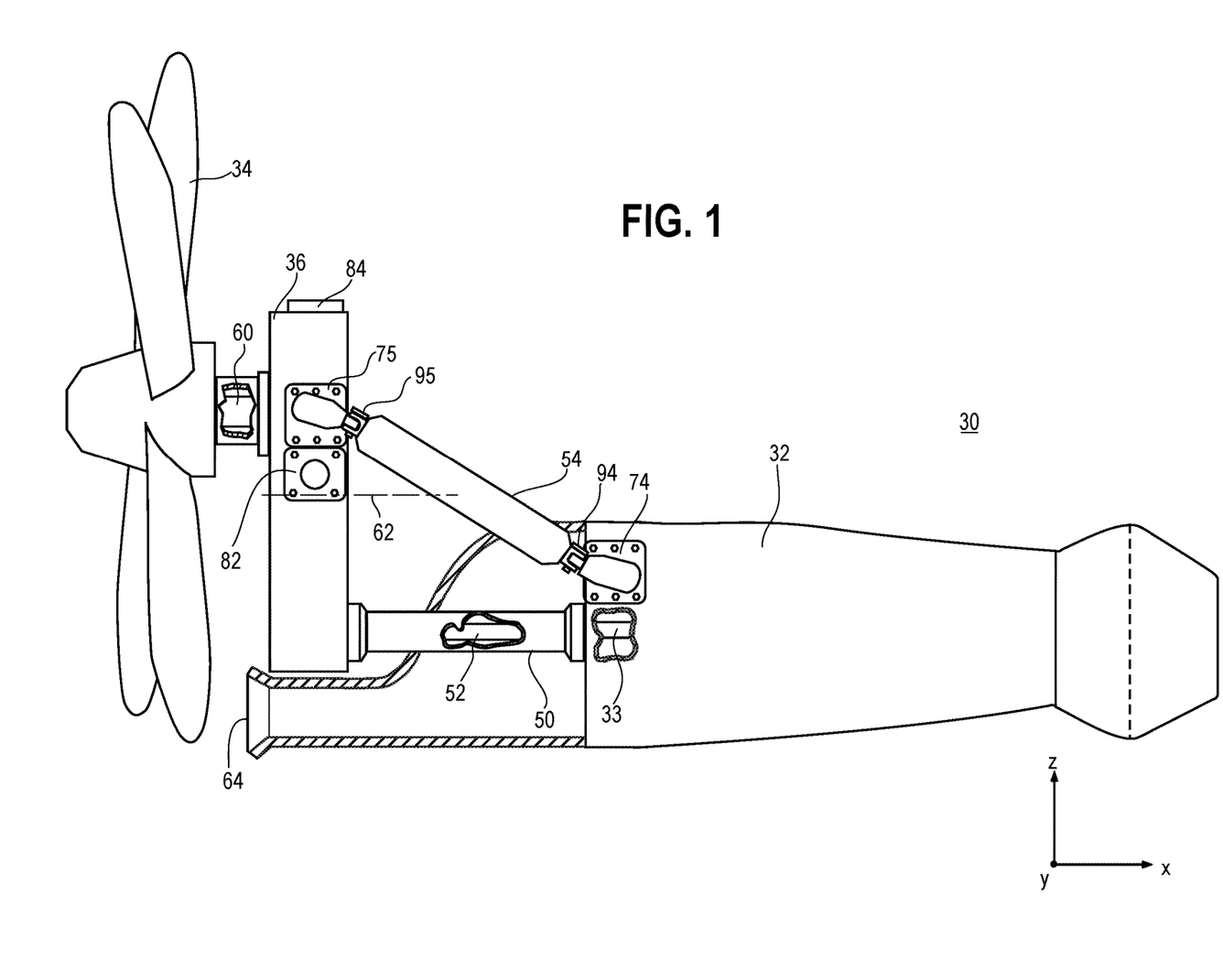
FIG. 1 is a side elevational view partly in section with portions broken away of a turboprop propulsion system.

Referring first to FIG. 1, a conventional aerospace turboprop propulsion system 30 comprises a gas turbine engine (GTE) 32, a turboprop propeller 34, and a gearbox 36 that couples the gas turbine engine 32 to the turboprop propeller 34. The propulsion system 30 may be located under the wing of an aircraft or at another location.

Recently, hybrid electric propulsion architecture configurations have been and continue to be developed whereby at least a portion of the power for aircraft propulsion is obtained from an electric system, including an electric motor. Alternatively or in addition, other power requirements may be supplied by an electric generator coupled to and driven by the gas turbine engine.

The system 30 can be modified using commercially available parts to produce a GTE/generator combination (i.e., a genset, such as a turbogenerator). Using the system 30 that uses turboprop propulsion as an example, the gearbox 36 and the turboprop propeller 34 may be decoupled from the GTE 32 and an electric generator 40 (FIGS. 5-7) may be coupled to the GTE 32. The power developed by the generator 40 may be conditioned and regulated by circuitry (not shown) as needed to supply electric power for one or more electric loads (such as an electric motor that develops motive power to assist in aircraft propulsion), as desired. The system comprising the combination may be mounted on or under an aircraft component, such as under an aircraft wing, or may be mounted within an aircraft or another vehicle or stationary housing, such as a pod, a test cell, or a frame on the ground.

Figure 2:
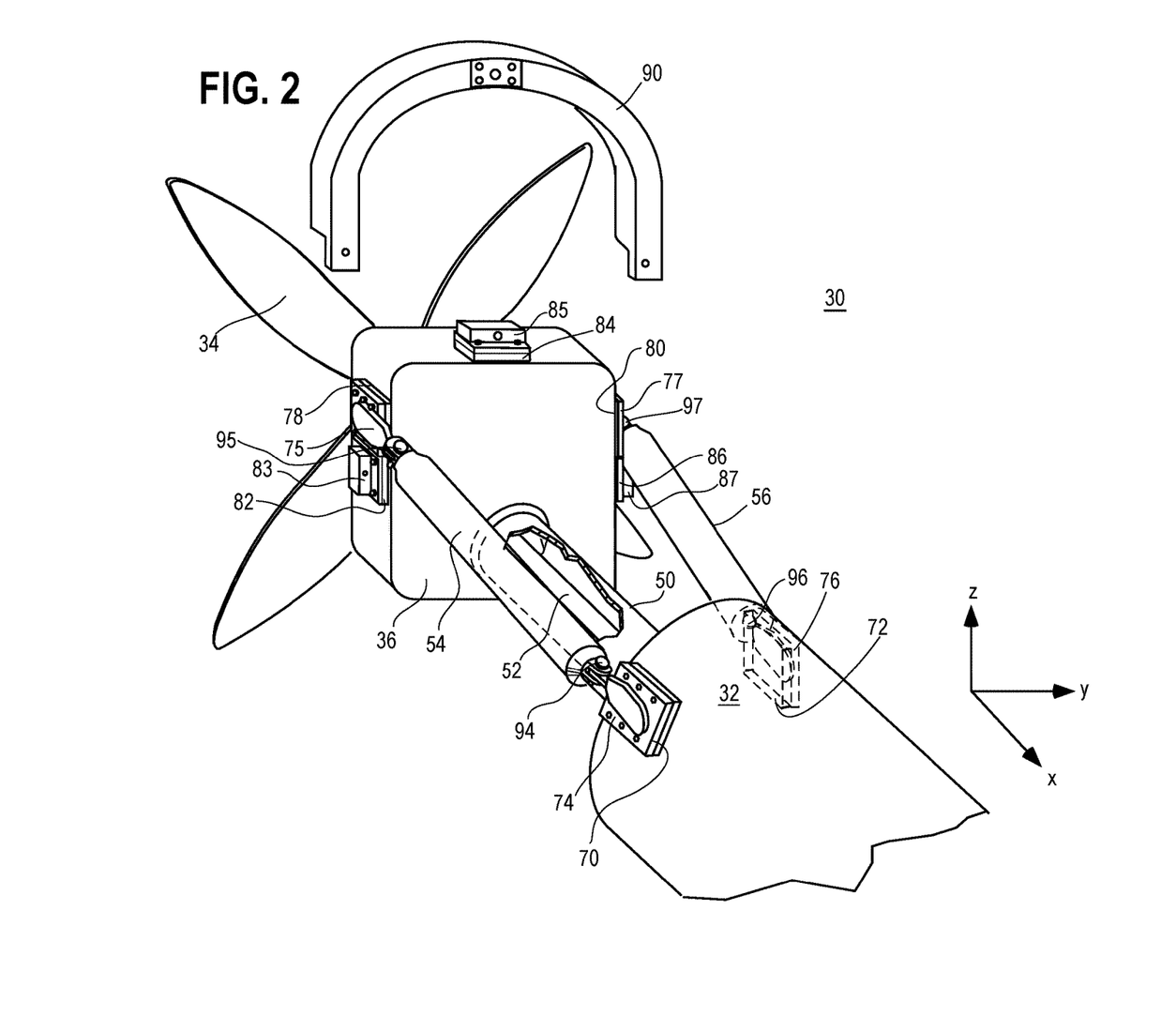
FIG. 2 is an isometric view partly exploded with a portion broken away looking forward of the turboprop propulsion system of FIG. 1.
Figure 3:
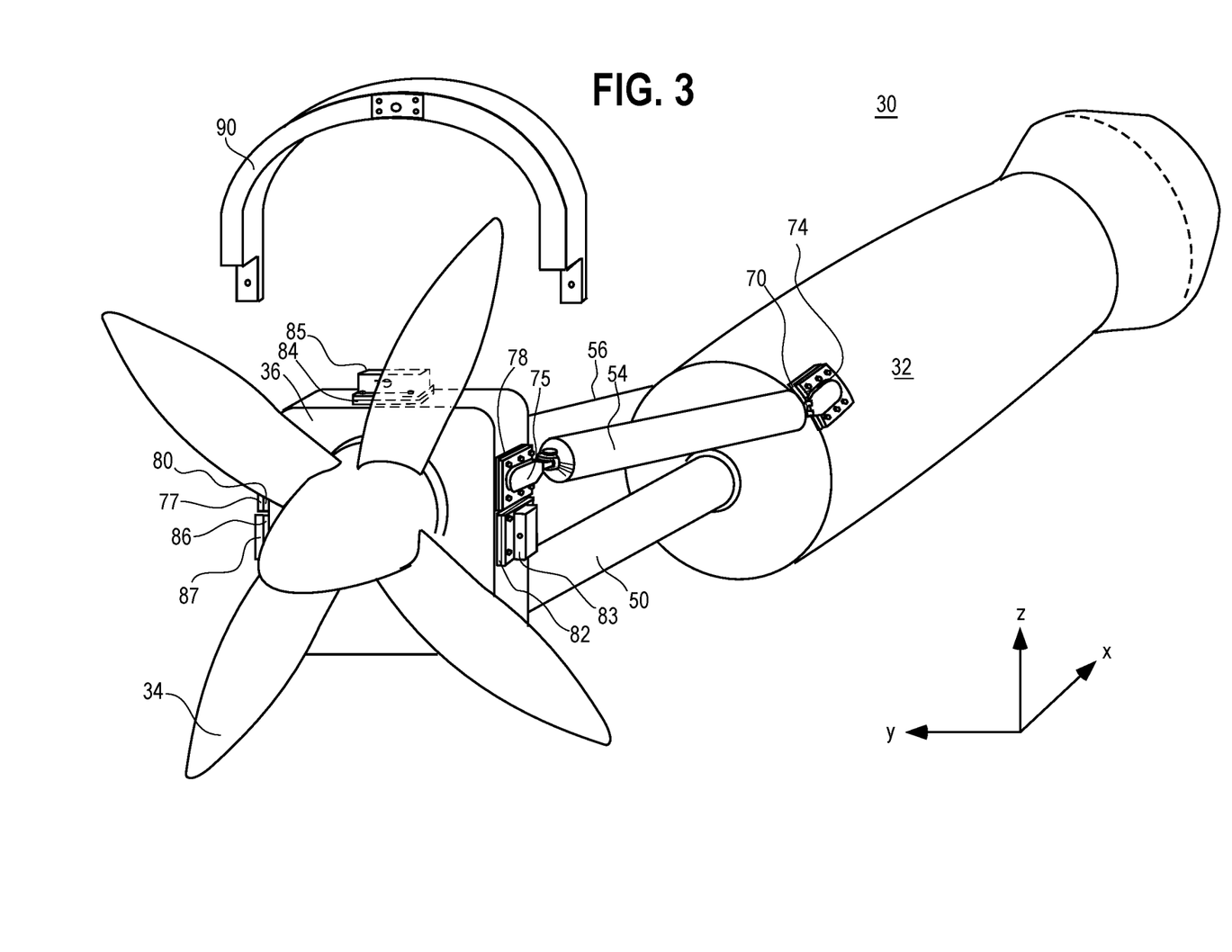
FIG. 3 is an isometric view partly exploded looking aft of the turboprop propulsion system of FIG. 1.

Referring to FIGS. 1-3, prior to disassembly, a torquemeter 50 having an output power drive shaft 52 extending therethrough is coupled to the gearbox 36 and the low pressure shaft 33 of the GTE 32. The gearbox 36 is secured by gearbox mounting struts 54, 56 to the GTE 32. The torquemeter 50 and drive shaft 52 are vertically offset with respect to a shaft 60 (seen in FIG. 1) of the turboprop propeller 34 and both shafts 52, 60 (seen in FIG. 1) are offset with respect to a horizontal centerline 62 along the x-direction (seen in FIG. 1) of the gearbox 36. The offsets are provided at least in part to allow sufficient room for an air intake shroud 64 (seen in FIG. 1) (the air intake shroud is omitted in the remaining figures, and may be redirected to another location not below the gearbox 36) to collect air for the GTE 32. Further, the struts 54, 56 are coupled to engine strut fittings 74, 76 that are, in turn, coupled to engine mounting pads 70, 72, respectively. The engine strut fittings 74, 76 are secured in any suitable fashion to the mounting pads 70, 72 of GTE 32, such as by bolts, and are coupled to the struts 54, 56 using mounting pins or bolts 94, 96. The engine mounting pads 70, 72 are located at approximately half past ten and half past one o'clock positions on the GTE 32 when viewed toward the aft, and thus the engine strut fittings 74, 76 are secured at the same positions. Similarly, the struts 54, 56 are coupled to gearbox strut fittings 75, 77 via mounting pins or bolts 95, 97. The struts 54, 56 extend forwardly and upwardly and the gearbox strut fittings 75, 77 are secured to gearbox mounting pads 78, 80 in any suitable fashion, such as by bolts. The gearbox mounting pads 78, 80 are located at opposite sides of the gearbox 36.

The gearbox 36 further includes spaced suspension mounting pads 82, 84, 86 and suspension fittings 83, 85, 87 may be secured in any suitable fashion thereto at spaced locations. The suspension fittings 83, 85, 87 may also be coupled in any suitable manner to a suspension apparatus comprising a suspension yoke 90, which is, in turn, adapted to be secured in any suitable manner to a suspending structure (not shown in FIGS. 1-3).

Figure 4:
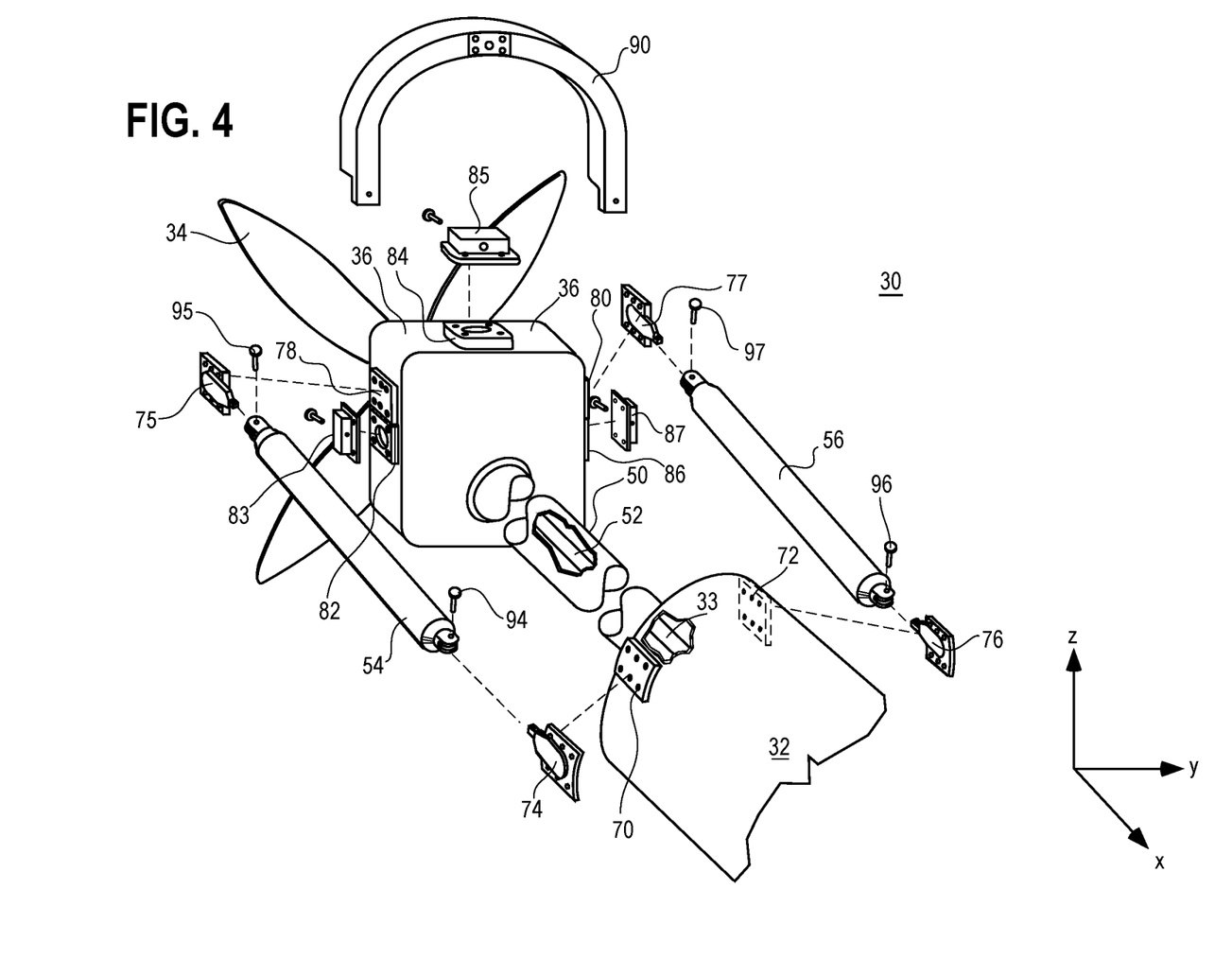
FIG. 4 is an exploded isometric view with portions broken away of the turboprop propulsion system during disassembly from the propeller gearbox.

Referring also to FIG. 4, in a specific embodiment the system 30 may be modified by disassembling the turboprop propeller 34 from the gearbox 36. The torquemeter 50 and the drive shaft 52 may further be uncoupled from an input power shaft (not shown) of the gearbox 36 and the low pressure shaft 33 of the GTE 32. The struts 54, 56 may be uncoupled from the gearbox strut fittings 75, 77 by removal of the mounting pins or bolts 95, 97. The gearbox strut fittings 75, 77 may also be uncoupled from the gearbox mounting pads 78, 80 of the gearbox 36. Furthermore, the struts 54, 56 may be uncoupled from the engine strut fittings 74, 76 by removal of the mounting pins or bolts 94, 96. Similarly to the gearbox strut fittings 75, 77, the engine strut fittings 74, 76 may be uncoupled from the engine mounting pads 70, 72 of the GTE 32. The suspension yoke 90 may be disconnected from the gearbox 36, if the yoke 90 is otherwise secured to the suspending structure or another structure at the time of disassembly. The gearbox 36 may then be removed from the system 30, as may be the struts 54, 56.

Of course, one or more of the steps of disassembly described above may be omitted and/or undertaken in a different order e.g., the gearbox 36 and the turboprop propeller 34 may be removed from the system 30 as a single unit, the struts 54, 56 may be disconnected from the gearbox strut fittings 75, 77 before the drive shaft 52 is uncoupled from the gearbox 36 and the low pressure shaft 33 of the GTE 32, and/or the struts 54, 56 may be disconnected from the engine strut fittings 74, 76 before the struts 54, 56 are disconnected from the gearbox strut fittings 75, 77, etc. In addition, one or more components not shown may also require disassembly from the gas turbine engine.

Figure 5:
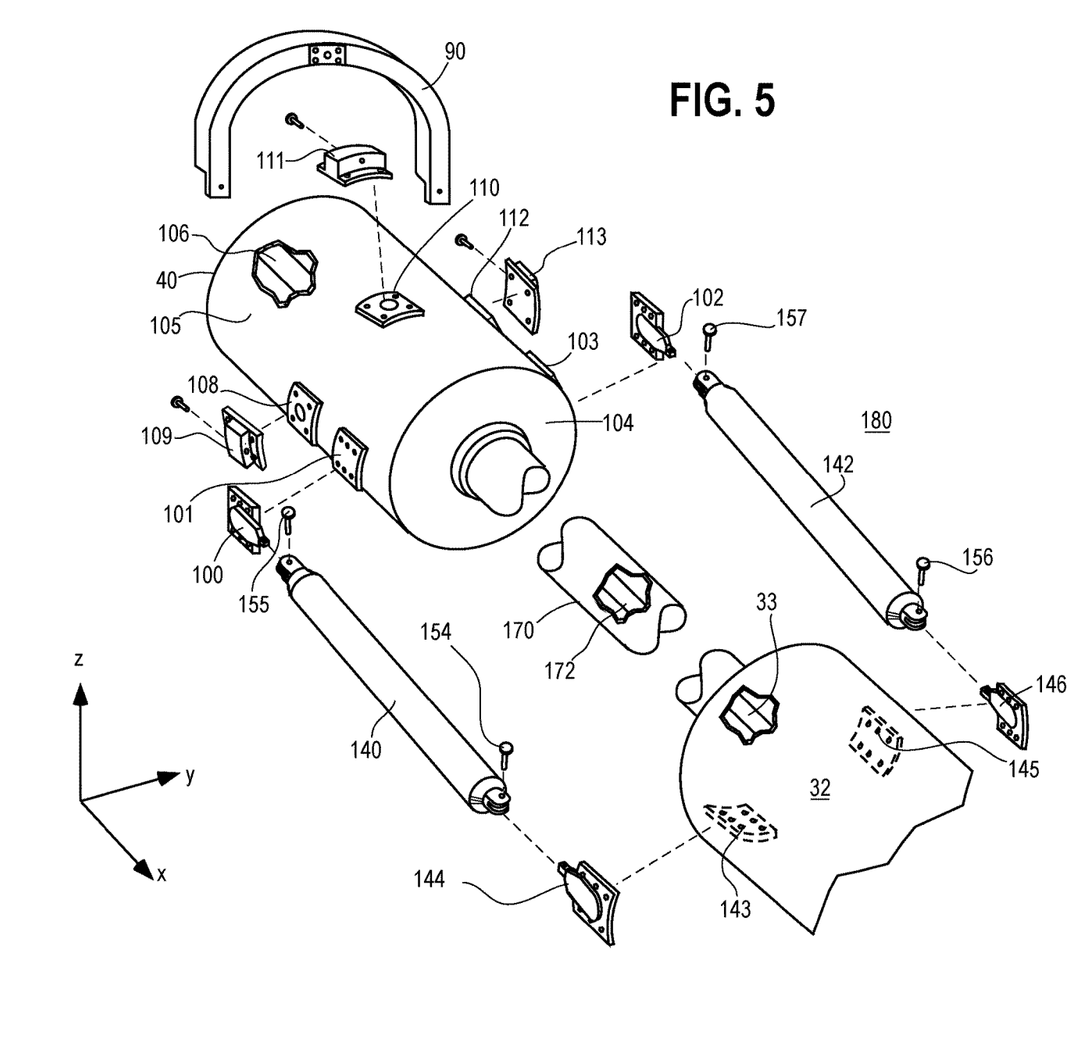
FIG. 5 is an exploded isometric view with portions broken away of the gas turbine engine of FIGS. 1-4 in conjunction with a generator and associated mounting components prior to assembly thereof.
Figure 6:
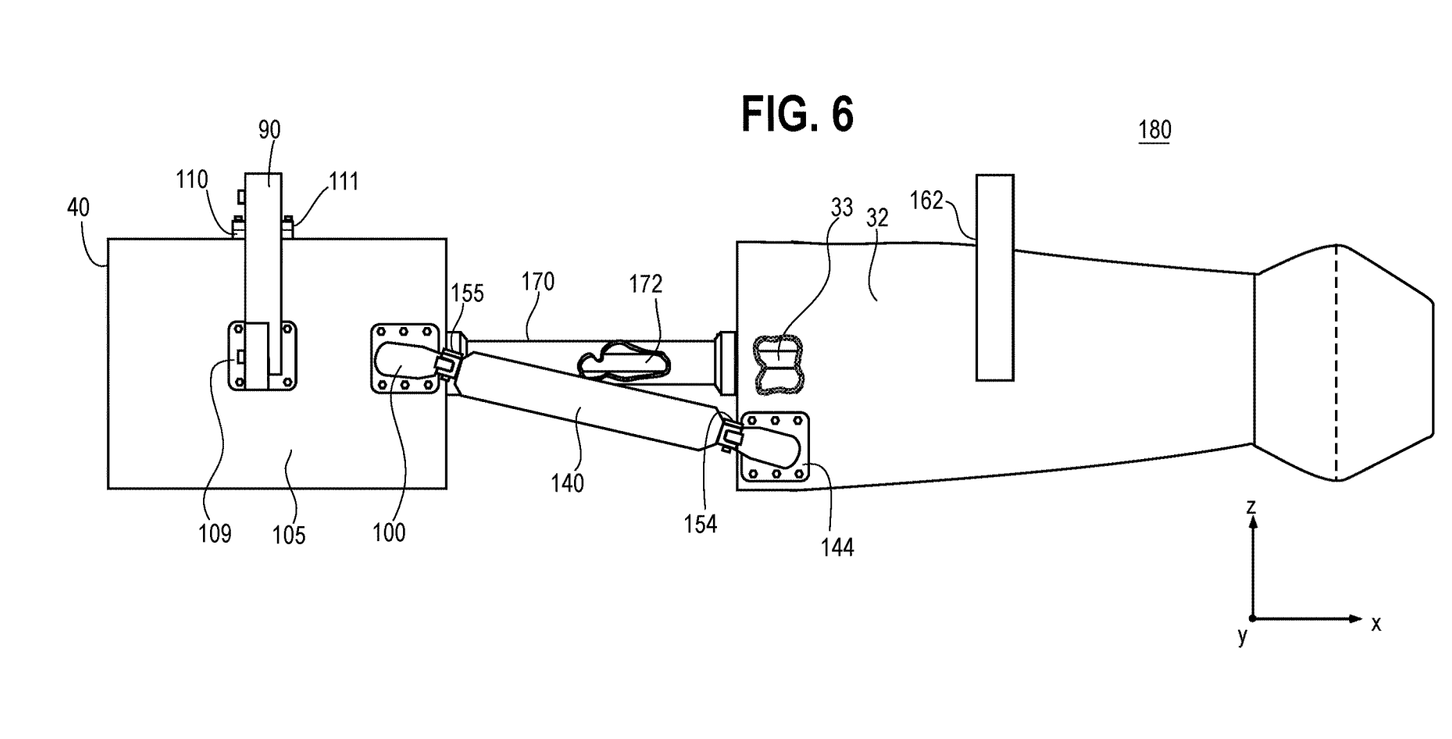
FIG. 6 is a side elevational view with portions broken away after assembly of the components of FIG. 5.
Figure 7:
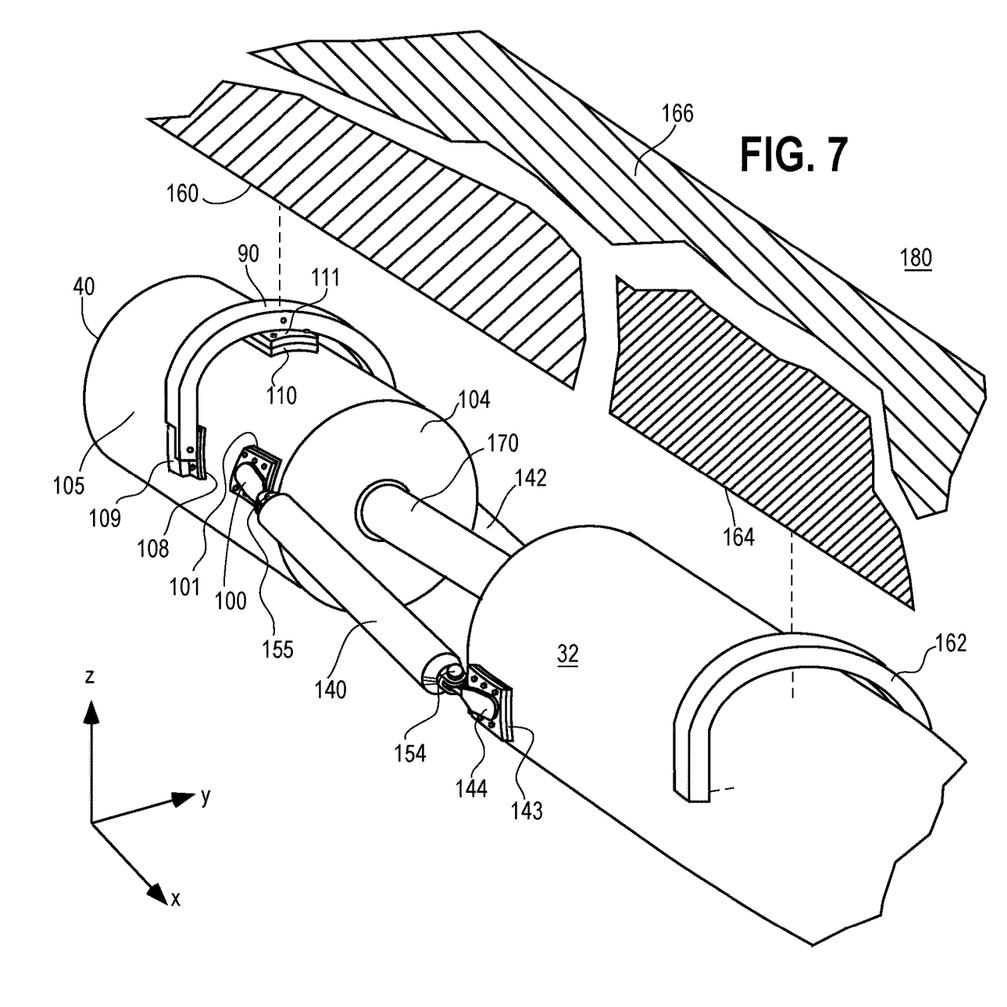
FIG. 7 is a partial fragmentary isometric view looking forward after assembly of the components of FIG. 5.

Referring to FIGS. 5-7, once disassembly is complete, the generator 40 may be coupled to the GTE 32 to form a new system 180. The generator 40 is prepared by securing generator strut fittings 100, 102, which are preferably (but not necessarily) similar or identical to or which may comprise the gearbox strut fittings 75, 77, in any suitable fashion to spaced mounting pads 101, 103 located adjacent or at an axial aft end 104 of the generator 40. In a preferred embodiment, these mounting pads 101, 103 are disposed at or approximately three o'clock and nine o'clock positions at radially outer surface(s) 105 of the generator 40, when viewed forwardly from an aft end of the generator 40, and adjacent the axial aft end 104. The generator strut fittings 100, 102 are thus preferably diametrically aligned (i.e., the generator strut fittings define a particular line parallel to the y-direction together with a central axis of an input power drive shaft 106 of the generator 40). Also preferably, this diametrical alignment (i.e., the particular line) is further aligned along (i.e., substantially coincident with) a z-direction with a center of gravity of the generator 40.

Further suspension fittings 109, 111, 113 may comprise one or more of the suspension fittings 83, 85, 87 or other fittings similar or identical thereto. The fittings 109, 111, 113 are secured in any suitable fashion, such as bolts, to spaced mounting pads 108, 110, and 112 disposed on the radially outer surface 105. At least one of the suspension fittings 109-113 is aligned with a center of gravity of the generator 40. Most preferably, the mounting pads 108-112 are disposed in a y-z axial plane normal to a central rotational axis extending in an x-direction of the generator 40 and the axial plane includes the center of gravity of the generator 40. Accordingly, the suspension fittings 109, 111, 113 are coincident with the center of gravity of the generator 40.

The GTE 32 is prepared for assembly by optionally removing the engine strut fittings 74, 76 and either refastening one or both engine strut fittings 74, 76 or fastening one or two other engine strut fittings 144, 146 to mounting pads 143, 145 on the GTE 32. Preferably, the mounting pads 143, 145, and thus the engine strut fittings 144, 146, lie on a line parallel to the y-direction. The mounting pads 143, 145 are equally spaced from the center line of the GTE 32 and are therefore equally spaced from center of gravity of GTE 32 and components carried therewith. In a specific embodiment, the engine strut fittings 74, 76 or 144, 146, are secured at approximately half past four o'clock and half past seven o'clock positions of the GTE 32, although such positions are approximate and may vary as noted below.

Depending upon the particular generator 40, GTE 32, and orientation or arraignment of associated components used in the system 180, the centers of gravity of the GTE 32 and the generator 40 may be different, in which case the locations of mounting portions of the pads 70, 72, 101, 103, 108, 110, 112, 143, and/or 145 may be varied to obtain a substantially balanced combination of system components.

First and second ends of each of a plurality of struts 140, 142 are secured to the engine strut fittings 74, 76 or 144, 146 and the generator strut fittings 100, 102, respectively, by mounting pins or bolts 154, 155, 156, 157 which may be similar or identical to mounting pins or bolts 94, 95, 96, 97.

The suspension yoke 90, which may comprise a portion of an overall suspension structure that includes multiple suspension devices, is bolted or otherwise secured to the suspension fittings 109, 111, and 113 as well as any additional pads that may be fastened to the generator 40, as necessary or desirable. The yoke 90 is, in turn, bolted or otherwise secured to a suitable support structure 160 (seen in FIGS. 6 and 7).

The torquemeter 170 and power output drive shaft 172, which may be (but not necessarily) similar or identical to the torquemeter 50 and power output drive shaft 52, are then coupled to an input power drive shaft 106 of the generator 40. The GTE 32 is suspended in a plane or line coincident with the center of gravity of the GTE and components carried thereby by one or more suspension devices, such as suspension yoke 162 or equivalent structure, to a suitable support structure 164. The suspension yoke 162 may be integral with or separate from the overall suspension structure. Further, the support structures 160, 164 may be separate or may be a part of and/or enclosed by a single enclosure 166 (seen in FIG. 7) that encloses the various parts and components of the resulting system, if desired. Such a single enclosure is preferably suitable for disposition in a structure, such as (but not limited to) an aircraft, a seagoing vessel, a spacecraft, a stationary structure, etc.

In the illustrated embodiment, the repositioning of the pads on the GTE 32 and the required spacing of the various elements of the system components may result in the need to use struts 140, 142 that are longer or shorter than the struts 54, 56, but otherwise identical thereto. The struts and/or any other components may be modified as necessary or desirable depending upon the particular installation.

It should be noted that some or all of the assembly steps described herein may be undertaken in a different order as suitable for the installation. In addition, assembly may require other components not shown here.

INDUSTRIAL APPLICABILITY

The result in the preferred embodiment is that the GTE 32 develops motive power that is transferred through the low pressure shaft to the output power drive shaft 172 to the input power drive shaft 106 of the generator 40. While the generator 40 may be of any type, the generator 40 is preferably of the synchronous type (such as a permanent magnet generator, a wound field generator, a brushless generator, etc.) that is supported by the struts 140, 142 and the yokes 90, 162 at points substantially or fully aligned with the centers of gravity of the generator 40 and the GTE 32, respectively. As should be evident to one of ordinary skill in the art, the generator 40 is individually balanced before installation, and hence the system configuration following assembly is such that static and dynamic forces during operation are minimized.

In summary, the foregoing approach leverages existing mounts and mounting components. By incorporating the same (or substantially the same) mounts onto the electric generator at the center of gravity thereof, weight and torque can be reacted within the surrounding support structure. In addition, the existing gearbox strut fittings are adapted for use on the generator housing and engine compressor inlet housing. The primary generator mounts and primary GTE mounts are designed to align with their respective centers of gravity. Because of this, the nominal stresses in the struts and torque tube links are minimized, which is desirable inasmuch as these components react to maneuver loads and torque between the GTE and the generator.

While the disclosed embodiment is described in connection with a turboprop propulsion system, it should be noted that the details disclosed herein are usable in connection with any kind of gas turbine engine-propulsion-type load combination, such as a turbofan power system, a turboshaft power system, or the like. Also, it is possible to assemble a resulting system using components or parts that are not previously assembled into a propulsion system. Thus, for example, a GTE adapted for use with a propulsion-type load may be coupled to a generator using the specified components and parts without any of the components and parts having been previously incorporated into a prior system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A genset, comprising:
a gas turbine engine having a low pressure shaft, wherein the gas turbine engine is adapted to provide mechanical power;
a generator having an input power shaft, wherein the generator is adapted to receive mechanical power to develop electric power; an output power shaft having a first end coupled to the low pressure shaft of the gas turbine and a second end coupled to the input power shaft of the generator;
a plurality of struts, wherein first ends of the plurality of struts are coupled to the gas turbine engine and second ends of the plurality of struts are coupled to the generator at locations disposed in a first plane that includes a center of gravity of the generator and is parallel with a central rotational axis of the generator; and
a suspension apparatus for mounting the genset to a support structure, the suspension apparatus attaching the gas turbine engine to the generator, wherein the suspension apparatus is attached to the gas turbine engine at a first mounting location disposed in a second plane that includes a gas turbine engine center of gravity and is perpendicular to a central rotational axis of the gas turbine engine, and is attached to the generator at a second mounting location disposed in a third plane that includes the generator center of gravity and is perpendicular to the rotational axis of the generator.

2. The genset of claim 1, wherein the plurality of struts comprise first and second struts.

3. The genset of claim 1, wherein the gas turbine engine comprises a gas turbine engine of a turboprop propulsion system.

4. The genset of claim 1, wherein the suspension apparatus suspends the gas turbine engine and the generator from an enclosed structure.

5. The genset of claim 1, wherein the suspension apparatus comprises first and second separate suspension devices.

6. The genset of claim 1, wherein the suspension apparatus comprises first and second suspension yokes.

7. A method of producing a genset, the method comprising the steps of:
(a.) providing a gas turbine engine having a low pressure shaft wherein the gas turbine engine is adapted to provide mechanical power;
(b.) providing a generator having an input power shaft;
(c.) providing an output power shaft having a first end and a second end;
(d.) providing a plurality of struts;
(e.) securing first ends of the plurality of struts to the gas turbine engine;
(f) securing second ends of the plurality of struts to the generator at locations disposed in a first plane that includes a center of gravity of the generator and is parallel with a central rotational axis of the generator;
(g.) coupling the low pressure shaft of the gas turbine engine to the first end of the output power shaft and coupling the input power shaft of the generator to the second end of the output power shaft; and
(h.) suspending the gas turbine engine to a support structure at an engine mounting location disposed in a second plane that includes a center of gravity of the gas turbine engine and is perpendicular to a central rotational axis of the gas turbine engine, and suspending the generator to the support structure at a generator mounting location disposed in a third plane that includes the center of gravity of the generator and is perpendicular to the central rotational axis of the generator.

8. The method of claim 1, wherein the step (d.) comprises the step of providing first and second struts.

9. The method of claim 1, wherein the step (a.) comprises the step of providing a gas turbine engine of a turboprop propulsion system.

10. The method of claim 1, wherein the step (h.) comprises the step of suspending the gas turbine engine and the generator from an enclosed structure.

11. The method of claim 1, wherein the step (h.) comprises the step of providing first and second separate suspension devices.

12. The method of claim 1, wherein the step (h.) comprises the step of providing first and second suspension yokes.

13. A method of producing a genset, the method comprising the steps of:
(a.) providing a gas turbine engine having a low pressure shaft;
(b.) providing a generator having an input power shaft and a generator mounting pad;
(c) providing an output power shaft with a first end and a second end wherein the first end is adapted to be coupled to the low pressure shaft of the engine;
(d.) securing a first mounting fitting to the gas turbine engine;
(e.) securing a second mounting fitting to the generator;
(f) providing a strut;
(g.) securing a first end of the strut to the first mounting fitting;
(h.) securing a second end of the strut to the second mounting fitting to support the generator, the second mounting fitting being at a location disposed in a y-z axial plane normal to a central rotational axis extending in an x-direction of the generator and in an axial plane including a center of gravity of the generator; and
(i.) coupling the output power shaft at the first end to the low pressure shaft of the gas turbine engine and at the second end to the input power shaft of the generator.

14. The method of claim 13, wherein the gas turbine engine is further adapted to be secured to the generator by a pair of struts and the step (f.) comprises the step of providing two struts substantially identical to the pair of struts except for length.

15. The method of claim 13, wherein the gas turbine engine of step (a.) is adapted to be coupled to the generator by a support apparatus including a pair of engine mounting pads secured to the gas turbine engine.

16. The method of claim 15, wherein the engine mounting pads are equally spaced from a center line of the gas turbine engine.

17. The method of claim 13, wherein the gas turbine engine is adapted to be coupled to the generator by a support apparatus including a pair of gearbox mounting pads.

18. The method of claim 13, wherein the generator mounting pad comprises a first generator mounting pad and a second generator mounting pad, wherein the first generator mounting pad and the second generator mounting pad are disposed on a line coincident with the center of gravity of the generator.

19. The method of claim 13, further comprising the step of (j.) further supporting the generator at least at a second location disposed in the y-z axial plane normal to the central rotational axis extending in the x-direction of the generator and the axial plane including the center of gravity of the generator.

20. The method of claim 19, wherein the step (j.) comprises the step of coupling a yoke to the second location.

* * * * *